(12) United States Patent  (10) Patent No.: US 8,818,816 B2
Inoue et al.  (45) Date of Patent: Aug. 26, 2014

(54) VOICE RECOGNITION DEVICE

(75) Inventors: Yuzuru Inoue, Tokyo (JP); Takayoshi Chikuri, Tokyo (JP); Yuki Furumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 683 days.

(21) Appl. No.: 13/056,488

(22) PCT Filed: Apr. 23, 2009

(86) PCT No.: PCT/JP2009/001870
§ 371 (c)(1),
(2), (4) Date: Jan. 28, 2011

(87) PCT Pub. No.: WO2010/013369
PCT Pub. Date: Feb. 4, 2010

(65) Prior Publication Data
US 2011/0178804 A1 Jul. 21, 2011

(30) Foreign Application Priority Data
Jul. 30, 2008 (JP) ................ 2008-196443

(51) Int. Cl.
*G10L 21/00* (2013.01)
(52) U.S. Cl.
USPC ........... 704/275; 704/246; 704/247; 704/251; 704/252
(58) Field of Classification Search
USPC ................ 704/246, 247, 251, 252, 275
See application file for complete search history.

(56) References Cited

U.S. PATENT DOCUMENTS

| 5,799,280 A * | 8/1998 | Degen et al. ............ 704/276 |
| 2004/0008222 A1* | 1/2004 | Hovatter et al. ........... 345/749 |
| 2005/0055218 A1* | 3/2005 | Julia et al. ............... 704/277 |
| 2005/0159950 A1* | 7/2005 | Roth et al. ............... 704/236 |

FOREIGN PATENT DOCUMENTS

| JP | 10-21254 A | 1/1998 |
| JP | 10-91309 A | 4/1998 |
| JP | 2004-252652 A | 9/2004 |
| JP | 2005-18442 A | 1/2005 |
| JP | 2005-258524 A | 9/2005 |
| WO | WO 2006/028171 A1 | 3/2006 |

* cited by examiner

*Primary Examiner* — Leonard Saint Cyr
(74) *Attorney, Agent, or Firm* — Birch, Stewart, Kolasch & Birch LLP

(57) ABSTRACT

A voice recognition device includes a voice input unit 11 for inputting a voice of an uttered button name to convert the voice into an electric signal, a voice recognition processing unit 12 for performing a voice recognition process according to a sound signal sent thereto, as the electric signal, from the voice input unit, a button candidate detecting unit 13 for detecting, as a button candidate, a button having a button name which partially matches a voice recognition result acquired by the voice recognition processing unit, a display control unit 15 for, when a plurality of candidate buttons are detected by the button candidate detecting unit, producing a screen showing a state in which at least one of the plurality of button candidates is selected, and a display unit 16 for displaying the screen produced by the display control unit.

7 Claims, 7 Drawing Sheets

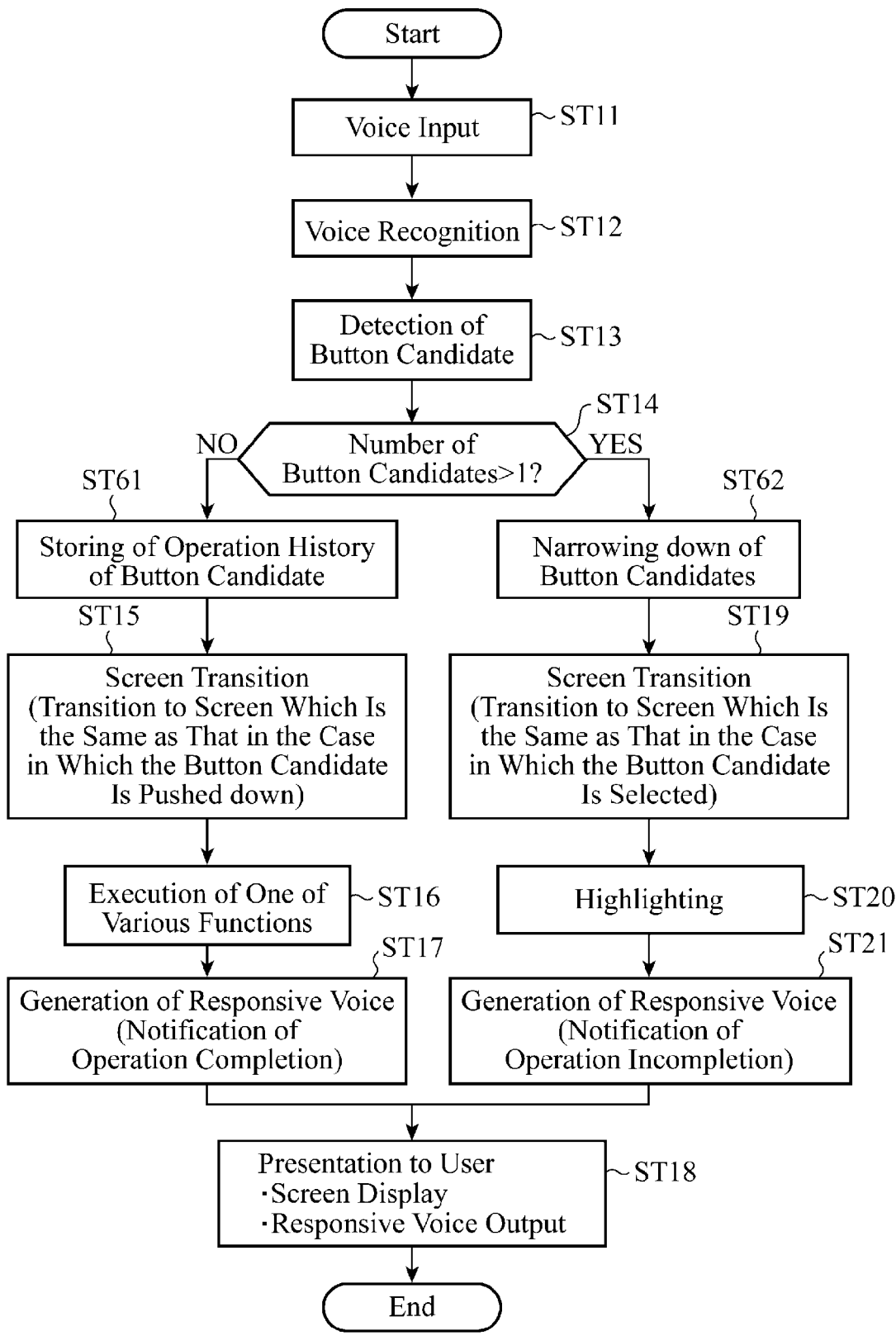

VOICE RECOGNITION DEVICE

FIELD OF THE INVENTION

The present invention relates to a voice recognition device that operates equipment, such as a navigation device, by voice, for example. More particularly, it relates to a technology of, when a voice operation is performed, carrying out the same process as that when a manual operation is performed.

BACKGROUND OF THE INVENTION

In a case of operating equipment by a user's voice, the details of the operation cannot be determined uniquely if the user's utterance is ambiguous. In order to solve this problem, conventionally, a method of allowing the user to select a correct candidate from among candidates provided by equipment as results of voice recognition is used typically. A problem with this method is, however, that because the method causes a transition to a screen which is specific to the voice operation and which does not exist in manual operations, it is difficult for the user to understand the procedure for selecting a correct candidate from among the candidates.

In order to solve the problem resulting from such the ambiguity of the user's utterance, patent reference 1 discloses an information input/output device that enables the user to correct interpretation results by voice, and to also select a candidate for the interpretation results by voice. In this information input/output device, an input interpretation candidate temporary output unit generates temporary presentation information which causes the user to select a candidate from among interpretation candidates which the input interpretation candidate temporary output unit has acquired from an input unit. A timer unit starts a time measuring operation in response to an output of the temporary presentation information, and generates a timer signal after a predetermined time interval has elapsed. When voice information for selection of a candidate is inputted from a voice recognition device or when the timer signal is emitted from the timer unit, an interpretation information selection/determination unit selects one candidate from among the interpretation candidates, and provides the selected candidate for an information processing unit as interpretation information. An output unifying unit unifies information output from the information processing unit, and the temporary presentation information from the input interpretation candidate set temporary output unit into information, and provides this information for an output unit as output information for the user.

Related Art Document

Patent Reference

Patent reference 1: JP,10-91309,A

A problem with the technology disclosed by above-mentioned patent reference 1 is, however, that since the user does not understand the correct voice command and therefore the user's utterance is ambiguous, it is difficult for the user to correct this utterance by voice.

The present invention is made in order to solve the above-mentioned problem, and it is therefore an object of the present invention to provide a voice recognition device that can carry out both a manual operation and a voice operation according to an identical procedure.

SUMMARY OF THE INVENTION

In order to solve the above-mentioned problem, a voice recognition device in accordance with the present invention includes: a voice input unit for inputting a voice of an uttered button name to convert the voice into an electric signal; a voice recognition processing unit for performing a voice recognition process according to a sound signal sent thereto, as the electric signal, from the voice input unit; a button candidate detecting unit for comparing a voice recognition result acquired by said voice recognition processing unit with button names prepared in advance of all buttons existing on all display screens so as to detect, as a button candidate, a button having a button name which partially matches the voice recognition result; a display control unit for, when a plurality of candidate buttons are detected by the button candidate detecting unit, producing a screen showing a state in which at least one of the plurality of button candidates is selected; and a display unit for displaying the screen produced by the display control unit.

The voice recognition device in accordance with the present invention can carry out a voice operation according to the same procedure as that according to which the voice recognition device performs a manual operation even if the user's utterance is ambiguous.

BRIEF DESCRIPTION OF THE FIGURES

FIG. 8 is a flow chart showing the operation of the voice recognition device in accordance with Embodiment 2 of the present invention, focusing on a voice operation process including up to a presentation of a recognition result to a user after recognizing the user's voice.

EMBODIMENTS OF THE INVENTION

Hereafter, in order to explain this invention in greater detail, the preferred embodiments of the present invention will be described with reference to the accompanying drawings.

Embodiment 1

Figure 1:
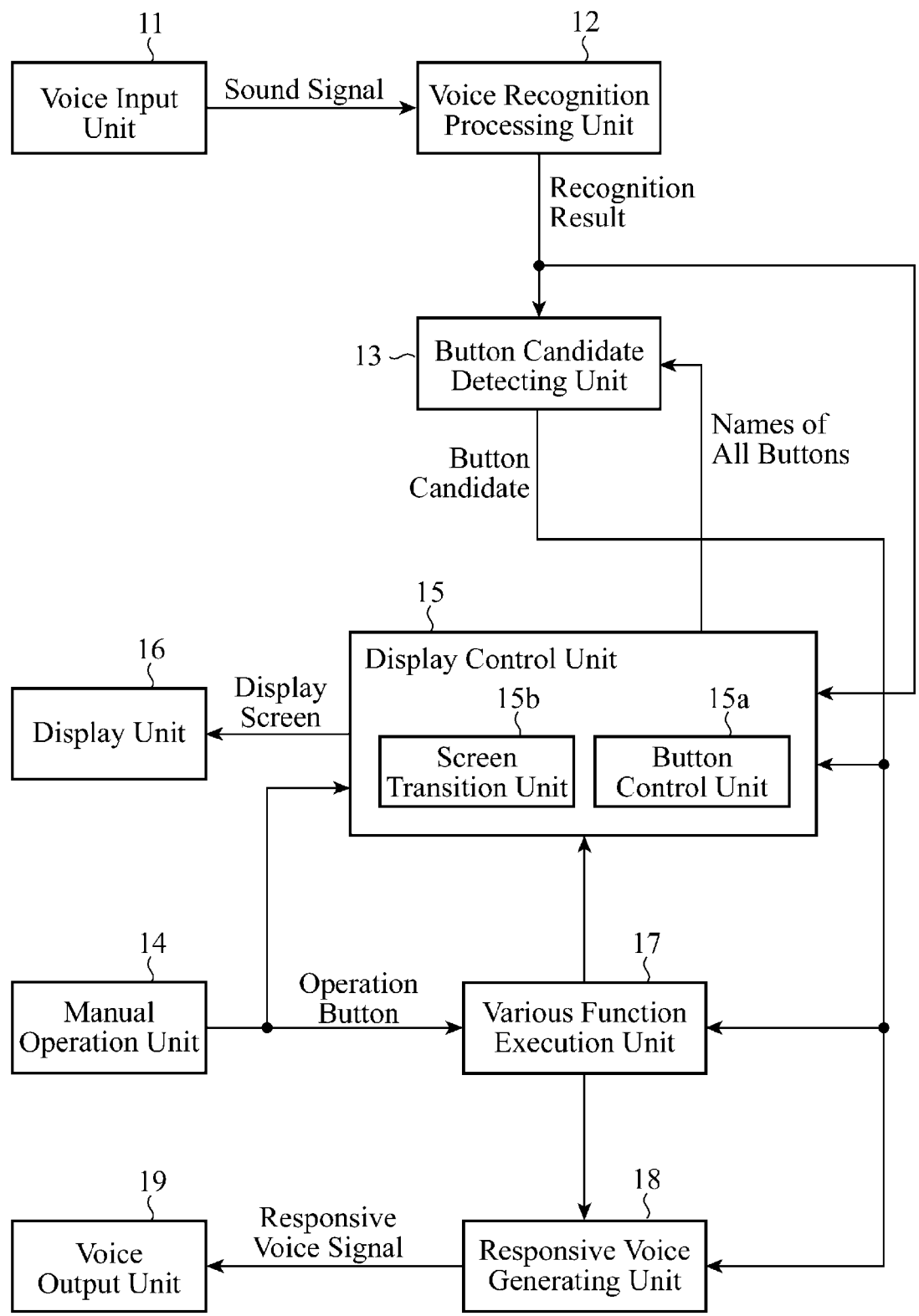
FIG. 1 is a block diagram showing the structure of a voice recognition device in accordance with Embodiment 1 of the present invention.

FIG. 1 is a block diagram showing the structure of a voice recognition device in accordance with Embodiment 1 of the present invention. This voice recognition device is provided with a voice input unit 11, a voice recognition processing unit 12, a button candidate detecting unit 13, a manual operation unit 14, a display control unit 15, a display unit 16, a various function execution unit 17, a responsive voice generating unit 18, and a voice output unit 19.

The voice input unit 11 is comprised of a microphone, for example, and converts a voice which a user has uttered into an electric signal and sends this electric signal to the voice recognition processing unit 12 as a sound signal.

The voice recognition processing unit 12 performs a voice recognition process according to the sound signal sent thereto from the voice input unit 11. The voice recognition process includes a voice interval detecting process of detecting an utterance interval (or section) from the inputted sound signal, an acoustic analysis process of converting a voice signal detected through the voice interval detecting process into sound parameters, a probability arithmetic process of selecting and identifying a phoneme candidate having maximum likelihood on the basis of minimum units of the voice acquired through the acoustic analysis process, and a comparison process of comparing the phoneme candidate acquired through the probability arithmetic process with a dictionary, in which words and so on are stored, so as to determine a recognition result.

In the acoustic analysis process, by using LPC (Linear Predictor Coefficient) mel-cepstrum or MFCC (Mel-Frequency Cepstrum Coefficient), for example, the inputted sound signal is converted into a feature vector sequence, and the shape (spectrum envelope) of the voice spectrum is estimated. In the probability arithmetic process, by using HMM (Hidden Markov Model), for example, the sound signal is divided into phonemic symbols using the sound parameters extracted through the acoustic analysis process according to the inputted voice, a phoneme candidate having maximum likelihood is selected from comparison with a standard phonemic model which is prepared beforehand. In the comparison process, a word having high likelihood is selected by comparison of the phoneme candidate with the dictionary. The recognition result acquired by the voice recognition processing unit 12 through the above-mentioned processes is sent to the button candidate detecting unit 13 and the display control unit 15.

The button candidate detecting unit 13 compares the recognition result acquired by the voice recognition processing unit 12 with the names (referred to the "button names" from there on) of all buttons acquired from the display control unit 15, i.e., the button names of all the buttons existing on all the screens, which are currently prepared in this voice recognition device, so as to detect, as a button candidate, a button having a button name which partially matches the recognition result. For example, when the recognition result is "YYY", and "XXXXXX", "YYYABC", "YYYDEF", and "ZZZZZZ" are prepared as the button names, two buttons having the button names of "YYYABC" and "YYYDEF" which "YYY" partially matches are detected as button candidates. In a case in which an ambiguous voice operation is carried out, the recognition result of the voice operation may partially match one or more button names.

In a case in which an exact voice operation is carried out, the recognition result of the voice operation can fully match a button name. In this case, the button candidate detecting unit 13 notifies the display control unit 15 and the various function execution unit 17 that the recognition result fully matches a button name (in FIG. 1, a route via which the notification is made is omitted). In this case, the same operation as that done when a corresponding button is pushed down via the manual operation unit 14 is carried out. Information showing one or more button candidates detected by this button candidate detecting unit 13 is sent to the display control unit 15, the various function execution unit 17, and the responsive voice generating unit 18 as button candidate data.

The manual operation unit 14 is used in order for the user to push down a button displayed on the screen of the display unit 16, for example. This manual operation unit 14 can be constructed of operation buttons disposed in a front panel of the voice recognition device, a remote controller (remote control) for generating a signal which is the same as that generated when one of these operation buttons is pushed down, a touch panel placed on the screen of the display unit 16, or a combination of some of these components. Operation button data which are generated through the user's operation on this manual operation unit 14 are sent to the display control unit 15 and the various function execution unit 17.

The display control unit 15 produces screen data for displaying an image on the screen of the display unit 16 according to either the button candidate data sent thereto from the button candidate detecting unit 13 or the operation button data sent thereto from the manual operation unit 14, and sends the screen data to the display unit 16. The display control unit 15 also produces screen data for displaying process results on the screen of the display unit 16 according to display data sent thereto from the various function execution unit 17, and sends the screen data to the display unit 16. The display control unit 15 stores the button names of all the buttons existing on all the screens, which are currently prepared in this voice recognition device, as mentioned above, and each of the button names can be read by the button candidate detecting unit 13.

This display control unit 15 is provided with a button control unit 15a and a screen transition unit 15b. The button control unit 15a can change the display style of a button on the screen. For example, the button control unit 15a performs a process of changing the color or brightness of a button candidate on the screen, blinking a button candidate, or changing the size or shape of a button candidate so as to highlight the button candidate on the screen. Because the voice recognition device can notify the user about which button on the screen is selected through this highlighting process, the voice recognition device can easily guide the user to the next operation.

When the button candidate data sent from the button candidate detecting unit 13 shows that a single button candidate is detected, the screen transition unit 15b performs a process of making a transition to a screen which is the same as that produced when the button candidate is pushed down, i.e., a screen which enables a function currently assigned to the button candidate pushed down to be carried out.

Furthermore, when the button candidate data sent thereto from the button candidate detecting unit 13 show that a plurality of button candidates are detected, and these button candidates exists on the screen currently being displayed, the screen transition unit 15b makes a transition to a screen showing a state in which at least one of the plurality of button candidates is selected. In contrast, when the button candidates do not exist on the screen currently being displayed, the screen transition unit performs a process of making a transition to a screen on which the plurality of button candidates exist. Screen data showing this screen to which the previous screen is being transited by the screen transition unit 15b are sent to the display unit 16.

The display unit 16 is comprised of an LCD (Liquid Crystal Display), for example, and displays an image according to the screen data sent thereto from the display control unit 15.

The various function execution unit 17 performs a process of implementing either a function currently assigned to the button candidate shown by the button candidate data sent thereto from the button candidate detecting unit 13, or a function currently assigned to the operation button shown by the operation button data sent thereto from the manual operation unit 14. Functions implemented by this various function execution unit 17 include a function of implementing HFT (Hands Free Telephone) or AV (Audio Visual), for example. When the process of implementing the function is completed, the various function execution unit 17 generates message data for notifying the user that the process of implementing the function is completed and sends the message data to the responsive voice generating unit 18, and also generates display data showing the process results and sends the display data to the display control unit 15.

When the button candidate data are sent thereto from the button candidate detecting unit 13, the responsive voice generating unit 18 generates a sound signal showing a reading of the button name of the button candidate shown by the button candidate data, and also generates a sound signal according to the message data sent thereto from the various function execution unit 17. The sound signals generated by this responsive voice generating unit 18 are sent to the voice output unit 19.

The voice output unit 19 is comprised of a speaker, for example, and outputs a voice according to the sound signal sent thereto from the responsive voice generating unit 18. Because these responsive voice generating unit 18 and the voice output unit 19 can notify the user about the button selected on the screen, the voice recognition device can easily guide the user to the next operation.

Next, the operation of the voice recognition device in accordance with Embodiment 1 of the present invention constructed as above will be explained. First, the operation of the voice recognition device will be explained with reference to a flow chart shown in FIG. 2, focusing on a voice operation process including up to a presentation of a recognition result to a user after recognizing the user's voice.

In this voice operation process, a user's voice is inputted first (step ST11). More specifically, the voice input unit 11 converts a voice uttered by a user into an electric signal, and sends this electric signal to the voice recognition processing unit 12 as a sound signal. Voice recognition is then carried out (step ST12). More specifically, the voice recognition processing unit 12 performs the voice recognition process on the basis of the sound signal sent thereto from the voice input unit 11, and sends the result of the recognition to the button candidate detecting unit 13.

A button candidate is then detected (step ST13). More specifically, the button candidate detecting unit 13 compares the recognition result sent thereto from the voice recognition processing unit 12 with all the button names which exist in all the screens and which are acquired from the display control unit 15 so as to detect, as a button candidate, one or more buttons each of which has a button name which partially matches the recognition result. Button candidate data showing the one or more button candidates detected by this button candidate detecting unit 13 are sent to the display control unit 15, the various function execution unit 17, and the responsive voice generating unit 18. When no button candidate is detected in this step ST13, the voice recognition device ends the voice operation process, though not illustrated.

Whether or not the number of the one or more button candidates detected is larger than "1" is then checked to see (step ST14). More specifically, the display control unit 15 checks to see whether or not the number of the one or more button candidates shown by the button candidate data sent thereto from the button candidate detecting unit 13 is larger than "1".

Figure 3:
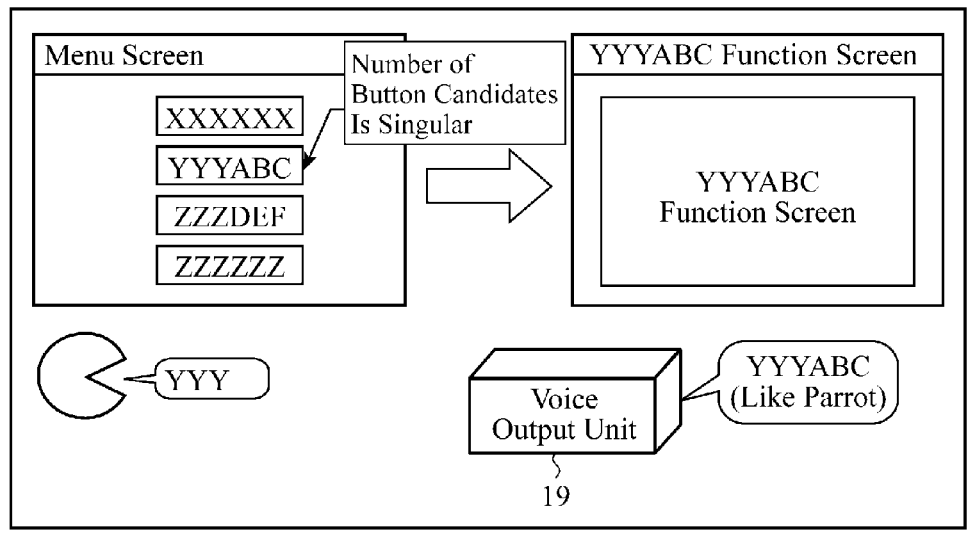
FIG. 3 is a view for explaining an operation when a single button candidate is detected by the voice recognition device in accordance with Embodiment 1 of the present invention.

When it is determined in this step ST14 that the number of the one or more button candidates detected is not larger than "1", i.e., the number of the one or more button candidates detected is singular, a screen transition is then carried out (step ST15). More specifically, the screen transition unit 15*b* of the display control unit 15 makes a transition to a screen which is the same as that produced in a case in which the button candidate is pushed down. As a result, for example, in a case in which the user utters "YYY" in a state in which the following button names: "XXXXXX", "YYYABC", "ZZZDEF", and "ZZZZZZ" are displayed on a menu screen, and only "YYYABC" is detected as a button candidate, the screen transition unit makes a transition to a YYYABC function screen, as shown in FIG. 3.

At this time, the responsive voice generating unit 18 generates a sound signal showing a reading of the button name of the button candidate shown by the button candidate data sent thereto from the button candidate detecting unit 13 so as to cause the user to check the reading, and sends the sound signal to the voice output unit 19. The voice output unit 19 outputs a voice according to the sound signal sent thereto from the responsive voice generating unit 18. As a result, the voice output unit 19 outputs an acknowledgement voice "YYYABC", like a parrot.

One of the various functions is then carried out (step ST16). More specifically, the various function execution unit 17 carries out a process of implementing a function assigned to the button candidate shown by the button candidate data sent thereto from the button candidate detecting unit 13. When then completing the process, the various function execution unit generates message data showing a notification of the completion of the operation and sends the message data to the responsive voice generating unit 18, and also generates display data showing the process results and sends the display data to the display control unit 15. The display control unit 15 generates screen data according to the display data sent thereto from the various function execution unit 17, and sends the screen data to the display unit 16.

A responsive voice is then generated (step ST17). More specifically, the responsive voice generating unit 18 generates a sound signal according to the message data showing the notification of the operation completion sent thereto from the various function execution unit 17, and sends the sound signal to the voice output unit 19.

A presentation to the user is then carried out (step ST18). More specifically, the display unit 16 produces a screen display according to the screen data sent thereto from the display control unit 15. As a result, the process results are displayed on the screen of the display unit 16. The voice output unit 19 also outputs a voice according to the sound signal sent thereto from the responsive voice generating unit 18. As a result, the notification showing that the operation has been completed is outputted by voice. Then, the voice operation process is ended.

Figure 4:
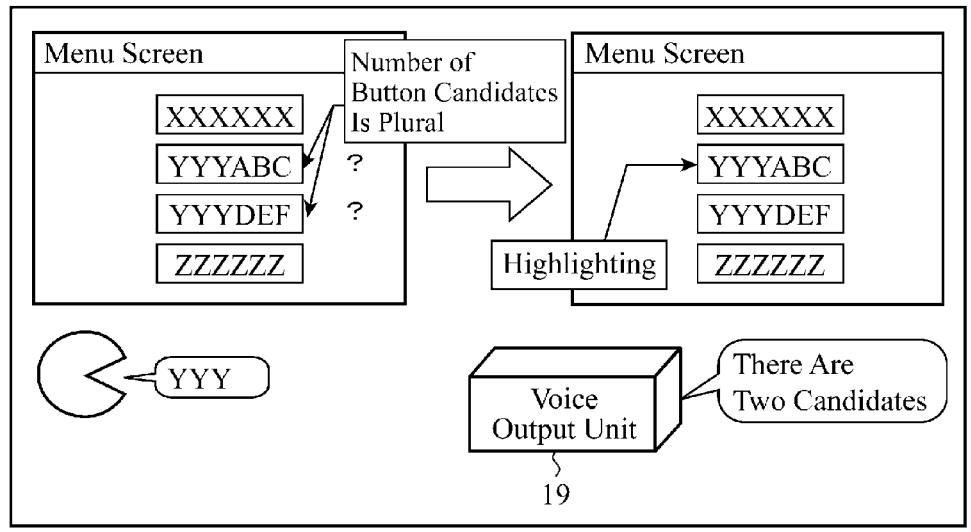
FIG. 4 is a view for explaining an operation when a plurality of button candidates are detected by the voice recognition device in accordance with Embodiment 1 of the present invention.

When it is determined in above-mentioned step ST14 that the number of the one or more button candidates detected is larger than "1", i.e., the number of the one or more button candidates is plural, a screen transition is then carried out (step ST19). More specifically, the screen transition unit 15*b* of the display control unit 15 makes a transition to a screen which is the same as that produced in a case in which the button candidate whose recognition result has maximum likelihood is selected. As a result, when the user utters "YYY" in the state in which the following button names: "XXXXXX", "YYYABC", "YYYDEF", and "ZZZZZZ" are displayed on the menu screen, and "YYYABC" and "YYYDEF" are detected as button candidates, for example, as shown in FIG. 4, the screen transition unit makes a transition to a state in which the button candidate "YYYABC" having maximum likelihood is selected. In this case, the screen transition unit can be alternatively constructed in such a way as to make a transition to a screen which is the same as that produced in a case in which at least one of the plurality of button candidates, instead of only the button candidate having maximum likelihood, is selected.

At this time, the responsive voice generating unit 18 generates a sound signal to cause the user to check the number of the one or more button candidates shown by the button candidate data sent thereto from the button candidate detecting unit 13, and sends the sound signal to the voice output unit 19, and the voice output unit 19 outputs a voice according to the sound signal sent thereto from the responsive voice generating unit 18. As a result, the voice output unit 19 outputs a message such as "there are two candidates" by voice, for example.

Highlighting is then carried out (step ST20). More specifically, the button control unit 15a of the display control unit 15 carries out a process of highlighting the button candidate having maximum likelihood by changing the color or brightness of this button candidate, blinking the button candidate, or changing the size or shape of the button candidate. The button control unit 15a can be alternatively constructed in such a way as to display the buttons other than the button candidate having maximum likelihood in a non-prominent form, instead of highlighting the button candidate having maximum likelihood. As an alternative, the button control unit 15a can be constructed in such a way as to highlight all the plurality of button candidates.

A responsive voice is then generated (step ST21). More specifically, the responsive voice generating unit 18 generates a sound signal according to message data showing that the operation has not been completed yet, and sends the sound signal to the voice output unit 19.

A presentation to the user is then carried out (step ST18). More specifically, the display unit 16 produces a screen display according to the screen data sent thereto from the display control unit 15. As a result, a menu screen in which the button candidate having maximum likelihood is highlighted is displayed on the screen of the display unit 16. The voice output unit 19 also outputs a voice according to the sound signal sent thereto from the responsive voice generating unit 18. As a result, a notification showing that the operation has not been completed yet is outputted by voice. Then, the voice operation process is ended.

Figure 5:
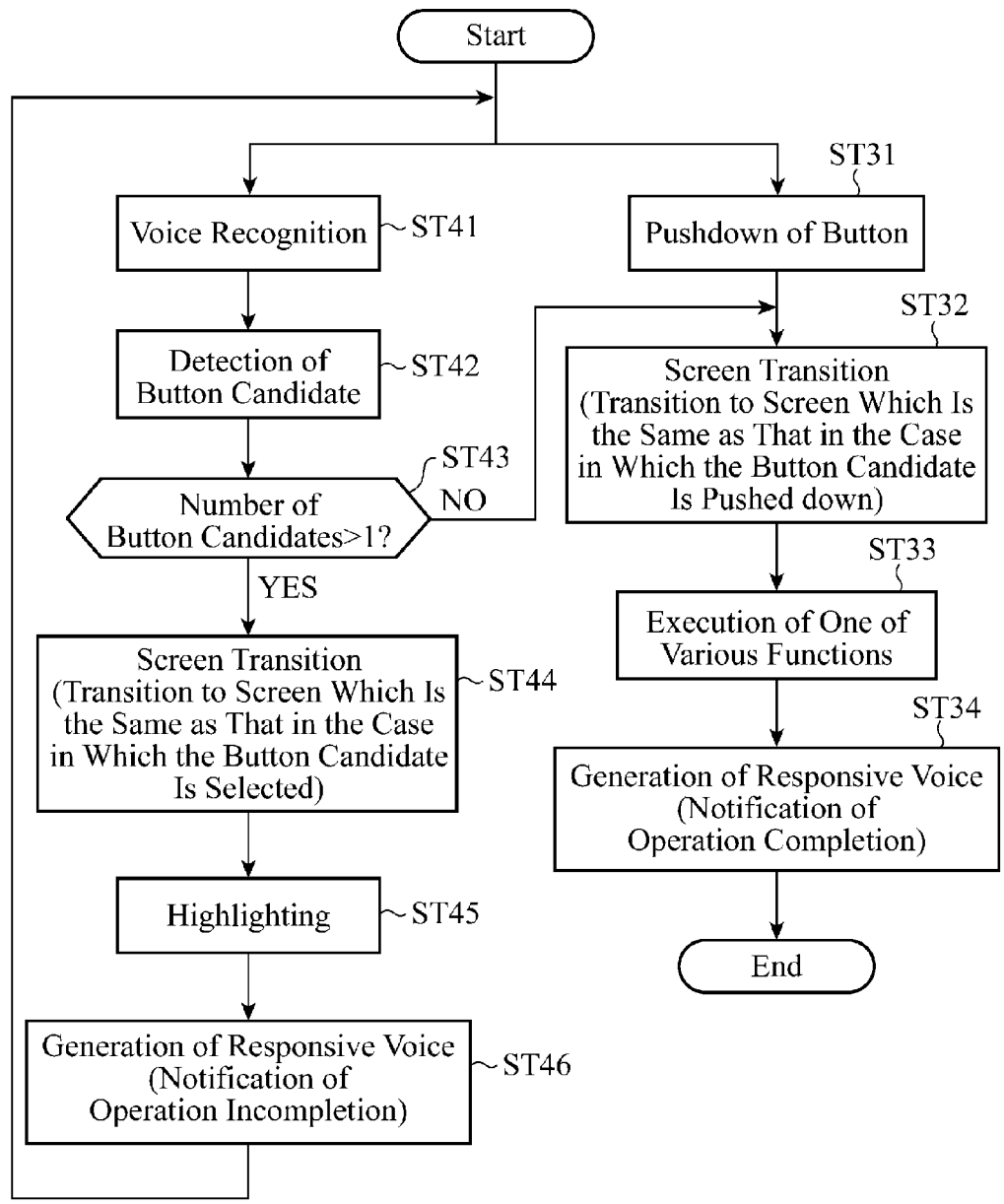
FIG. 5 is a flow chart showing the operation of the voice recognition device in accordance with Embodiment 1 of the present invention, focusing on the voice operation process including from an addition operation up to completion of the operation at the time when the operation has not been completed yet.

Next, the operation of the voice recognition device will be explained with reference to a flow chart shown in FIG. 5, focusing on the voice operation process including up to the completion of the operation after an addition operation has been performed at the time when the operation has not been completed yet. This voice operation process can be configured in such a way as to support both the voice operation using voice recognition, and the manual operation using pushdown of a button.

First, the manual operation using pushdown of a button will be explained. In the voice operation process according to a manual operation, a button is pushed down first (step ST31). More specifically, in a state in which a plurality of button candidates are selected, the user operates the manual operation unit 14 to push down a button displayed on the screen of the display unit 16. Operation button data generated when the user operates this manual operation unit 14 are sent to the display control unit 15 and the various function execution unit 17.

A screen transition is then carried out (step ST32). More specifically, the screen transition unit 15b of the display control unit 15 makes a transition to a function screen prepared for the function corresponding to the operation button which has been pushed down by the user.

One of the various functions is then carried out (step ST33). More specifically, the various function execution unit 17 carries out a process of implementing the function assigned to the button shown by the operation button data sent thereto from the manual operation unit 14. When the process is then completed, the various function execution unit generates message data showing a notification of the completion of the operation, and sends the message data to the responsive voice generating unit 18.

A responsive voice is then generated (step ST34). More specifically, the responsive voice generating unit 18 produces a sound signal according to the message data showing the notification of the completion of the operation which are sent thereto from the various function execution unit 17, and sends the sound signal to the voice output unit 19. The voice output unit 19 outputs a voice according to the sound signal sent thereto from the responsive voice generating unit 18. As a result, the notification showing that the operation has been completed is outputted by voice. Then, the voice operation process is ended.

When display data showing the process results are generated in step ST33, the generated display data are sent to the display control unit 15. The display control unit 15 generates screen data according to the display data sent thereto from the various function execution unit 17, and sends the screen data to the display unit 16. The display unit 16 produces a screen display according to the screen data sent thereto from the display control unit 15. As a result, the process results are displayed on the screen of the display unit 16.

Next, the voice operation using voice recognition will be explained. In the voice operation process according to the voice operation, voice recognition is carried out first (step ST41). The process of this step ST41 is the same as that of step ST12 of the flow chart shown in FIG. 2. The voice recognition carried out in this step ST41 can be configured in such a way that only the button name of one or more button candidates detected at the time of the previous voice operation are defined as a standby word (a word which can be recognized). According to this structure, the recognition of a button candidate becomes easy.

One or more button candidates are then detected (step ST42). The process of this step ST42 is the same as that of step ST13 of the flow chart shown in FIG. 2. Whether or not the number of the one or more button candidates detected is larger than "1" is then checked to see (step ST43). More specifically, the display control unit 15 checks to see whether or not the number of the one or more button candidates shown by the button candidate data sent thereto from the button candidate detecting unit 13 is larger than "1". When it is determined in this step ST43 that the number of the one or more button candidates detected is not larger than "1", i.e., the number of the one or more button candidates detected is singular, the voice recognition device advances the sequence to step ST32 and then makes a screen transition as mentioned above. More specifically, the screen transition unit 15b of the display control unit 15 makes a transition to a screen which is the same as that produced in a case in which the button candidate is pushed down. Then, the above-mentioned process is carried out.

In contrast, when it is determined in step ST43 that the number of the one or more button candidates detected is larger than "1", i.e., the number of the one or more button candidates detected is plural, a screen transition is then carried out (step ST44). The process of this step ST44 is the same as that of step ST19 of the flow chart shown in FIG. 2. Highlighting is then carried out (step ST45). The process of this step ST45 is the same as that of step ST20 of the flow chart shown in FIG. 2. A responsive voice is then generated (step ST46). The process of this step ST46 is the same as that of step ST21 of the flow chart shown in FIG. 2. After that, the voice recognition device returns the sequence to step ST31 or step ST41, and repeats the above-mentioned processing.

Figure 6:
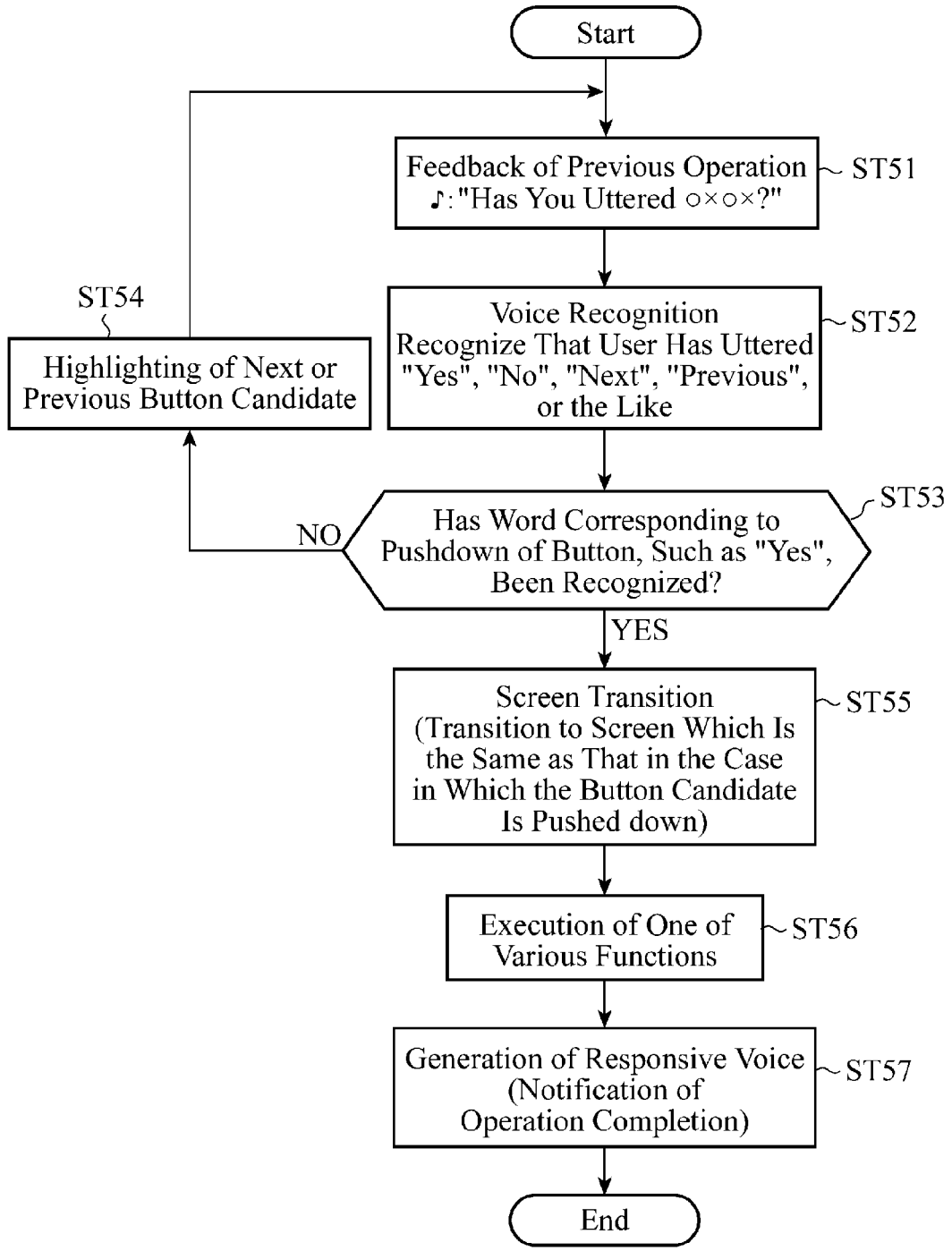
FIG. 6 is a flow chart showing the operation of the voice recognition device in accordance with Embodiment 1 of the present invention, focusing on the voice operation process including completion of the operation in response to the user's utterance of a word other than button names at the time when the operation has not been completed yet.

Next, the operation of the voice recognition device will be explained with reference to a flow chart shown in FIG. 6, focusing on a voice operation process of completing the operation in response to the user's utterance of a word other than button names at the time when the operation has not been completed yet.

In this voice operation process, feedback of the previous operation is carried out first (step ST51). More specifically, the responsive voice generating unit 18 produces a sound signal showing a message of the feedback of the previous operation, and sends the sound signal to the voice output unit 19. The voice output unit 19 outputs a voice according to the sound signal sent thereto from the responsive voice generating unit 18. As a result, the following message: "Has you uttered oxox?" is outputted by voice. The user utters "yes", "no", "next", "previous", or the like in response to this message.

Voice recognition is then carried out (step ST52). More specifically, the voice recognition processing unit 12 carries out the voice recognition process according to the sound signal sent thereto from the voice input unit 11, and sends a recognition result to the display control unit 15.

Whether or not a word corresponding to a case in which a button, such as "yes", is pushed down has been recognized is then checked to see (step ST53). More specifically, the display control unit 15 checks to see whether or not the recognition result sent thereto from the voice recognition processing unit 12 shows a word corresponding to the case in which a button, such as "yes", is pushed down. A word corresponding to the case in which a button, such as "yes", is pushed down can include affirmative words having a similar meaning, such as "Yes" and "O.K.".

When it is determined in this step ST53 that any word corresponding to the case in which a button, such as "yes", is pushed down has not been recognized, e.g., when it is determined that a negative word, such as "no", "previous", or "next", has been recognized, the next or previous button candidate is highlighted (step ST54). More specifically, the button control unit 15a of the display control unit 15 carries out a process of highlighting the next or previous button candidate by changing the color or brightness of the button candidate, blinking this button candidate, or changing the size or shape of the button candidate. After that, the voice recognition device returns the sequence to step ST51 and then repeats the above-mentioned processing.

In contrast, when it is determined in step ST53 that a word corresponding to the case in which a button, such as "yes", is pushed down has been recognized, a screen transition is then carried out (step ST55). More specifically, the screen transition unit 15b of the display control unit 15 makes a transition to a screen which is the same as that produced in a case in which the next or previous button candidate is pushed down.

One of the various functions is then carried out (step ST56). The process of this step ST56 is the same as that of step ST16 shown in FIG. 2. A responsive voice is then generated (step ST57). The process of this step ST57 is the same as that of step ST17 shown in FIG. 2. As a result, while the process results are displayed on the screen of the display unit 16, a notification showing that the operation has been completed is outputted by voice. After that, the voice operation process is ended.

As previously explained, because the voice recognition device in accordance with Embodiment 1 of the present invention is constructed in such a way as to detect a button having a button name which partially matches the result of the voice recognition as a button candidate, and, when a plurality of button candidates are detected, produce a screen display in a state in which at least one of the plurality of button candidates is selected so as to enable the user to push down one of the button candidates, the voice recognition device can carry out a voice operation according to the same procedure as that according to which the voice recognition device performs a manual operation even if the user's utterance is ambiguous. Furthermore, because the voice recognition device does not display a screen specific to voice operations, such as a screen displaying a candidate list which is often produced in order to solve the ambiguity, the simplicity of the voice operation is not impaired.

Embodiment 2

Figure 7:
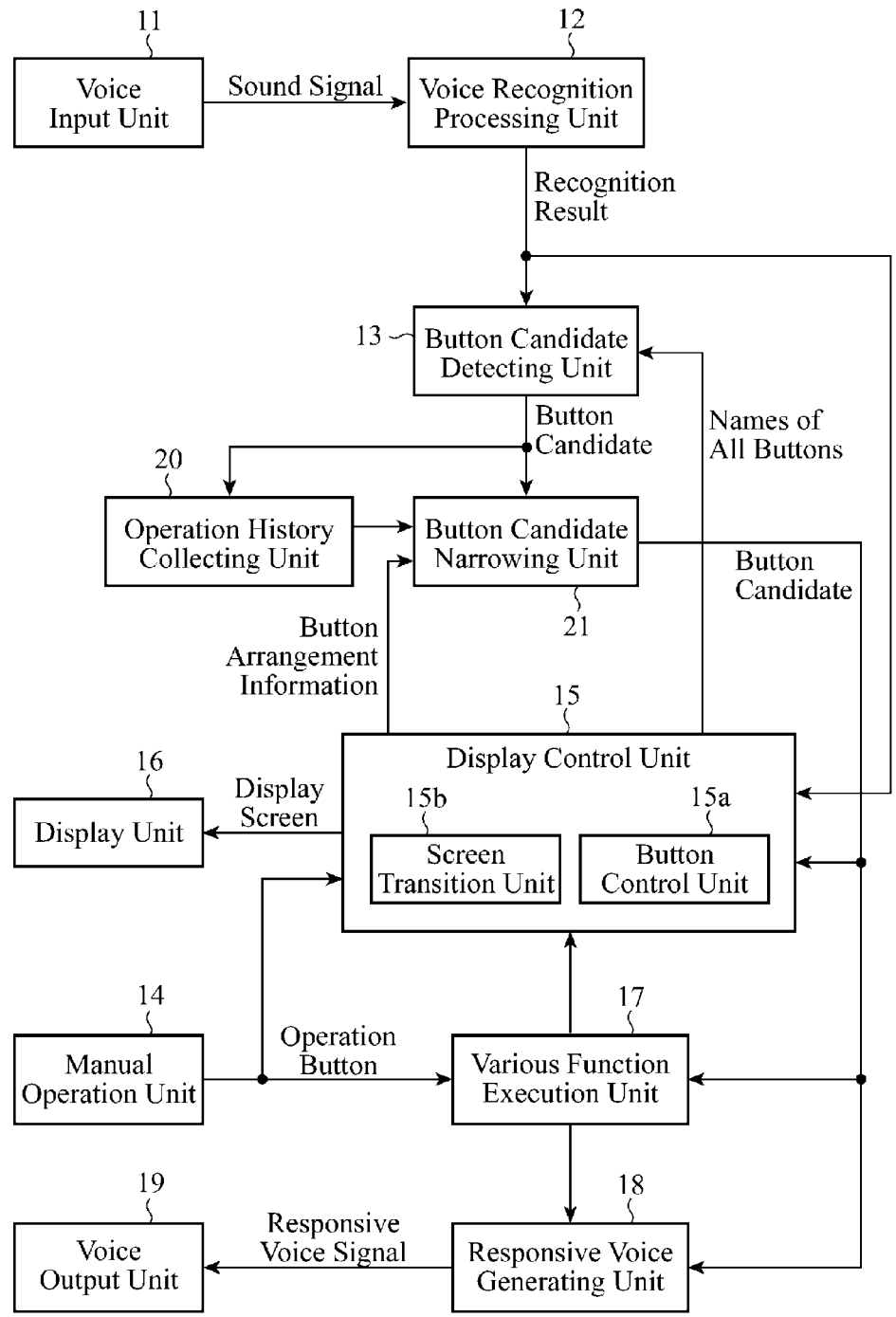
FIG. 7 is a block diagram showing the structure of a voice recognition device in accordance with Embodiment 2 of the present invention.

FIG. 7 is a block diagram showing the structure of a voice recognition device in accordance with Embodiment 2 of the present invention. This voice recognition device is constructed in such a way as to include an operation history collecting unit 20 and a button candidate narrowing unit 21 in addition to the components of the voice recognition device in accordance with above-mentioned Embodiment 1. The voice recognition device is further modified in such a way that information showing one or more button candidates detected by a button candidate detecting unit 13 is sent to the button candidate narrowing unit 21.

The operation history collecting unit 20 collects operation histories of buttons which have been operated through voice operations. More specifically, the operation history collecting unit 20 stores an operation history which is a correspondence between the button name and the number of operations for each of all the buttons, and, when the information showing button candidates sent from the button candidate detecting unit 13 shows that a single button candidate is detected, the operation history collecting unit increments the number of operations corresponding to the button name of this button candidate. The operation history stored in this operation history collecting unit 20 is referred to by the button candidate narrowing unit 21.

When the information showing button candidates sent from the button candidate detecting unit 13 shows that a plurality of button candidates are detected, the button candidate narrowing unit 21 refers to the operation history collecting unit 20 so as to select the button candidate which has been operated most frequently from among the plurality of button candidates. The button candidate narrowed down by this button candidate narrowing unit 21 is informed to a display control unit 15, a various function execution unit 17, and a responsive voice generating unit 18 as button candidate data.

Next, the operation of the voice recognition device in accordance with Embodiment 2 of the present invention will be explained with reference to a flow chart shown in FIG. 8, focusing on a voice operation process including from recognition of a user's voice up to a presentation of the recognition result to the user. The steps in each of which either the same process as that carried out by the voice recognition device in accordance with Embodiment 1 shown in the flow chart of FIG. 2 or a like process is carried out are designated by the same reference characters as those shown in FIG. 2, and the explanation of the steps will be simplified.

In this voice operation process, a voice is inputted first (step ST11). Recognition of the voice is then carried out (step ST12). One or more button candidates are then detected (step ST13). Whether or not the number of the one or more button candidates detected is larger than "1" is then checked to see (step ST14).

When it is determined in this step ST14 that the number of the one or more button candidates detected is not larger than "1", i.e., the number of the one or more button candidates detected is singular, an operation history of the button candidate is stored (step ST61). More specifically, the operation history collecting unit 20 increments the number of operations corresponding to the button name of the button candidate shown by the information showing the button candidate which is sent thereto from the button candidate detecting unit 13.

A screen transition is then carried out (step ST15). One of various functions is then carried out (step ST16). A responsive voice is then generated (step ST17). A presentation to the user is then carried out (step ST18). After that, the voice operation process is ended.

In contrast, when it is determined in above-mentioned step ST14 that the number of the one or more button candidates detected is larger than "1", i.e., the number of the one or more button candidates detected is plural, the button candidates are then narrowed down (step ST62). More specifically, the button candidate narrowing unit 21 refers to the operation history collecting unit 20, and narrows down the plurality of button candidates shown by the information showing the button candidates sent thereto from the button candidate detecting unit 13 by selecting the button candidate which has been operated most frequently from among the plurality of button candidates. Information showing the button candidate narrowed down by this button candidate narrowing unit 21 is sent to the display control unit 15, the various function execution unit 17, and the responsive voice generating unit 18 as button candidate data.

A screen transition is then carried out (step ST19). Highlighting is then carried out (step ST20). A responsive voice is then generated (step ST21). A presentation to the user is then carried out (step ST18). After that, the voice operation process is ended.

Figure 2:
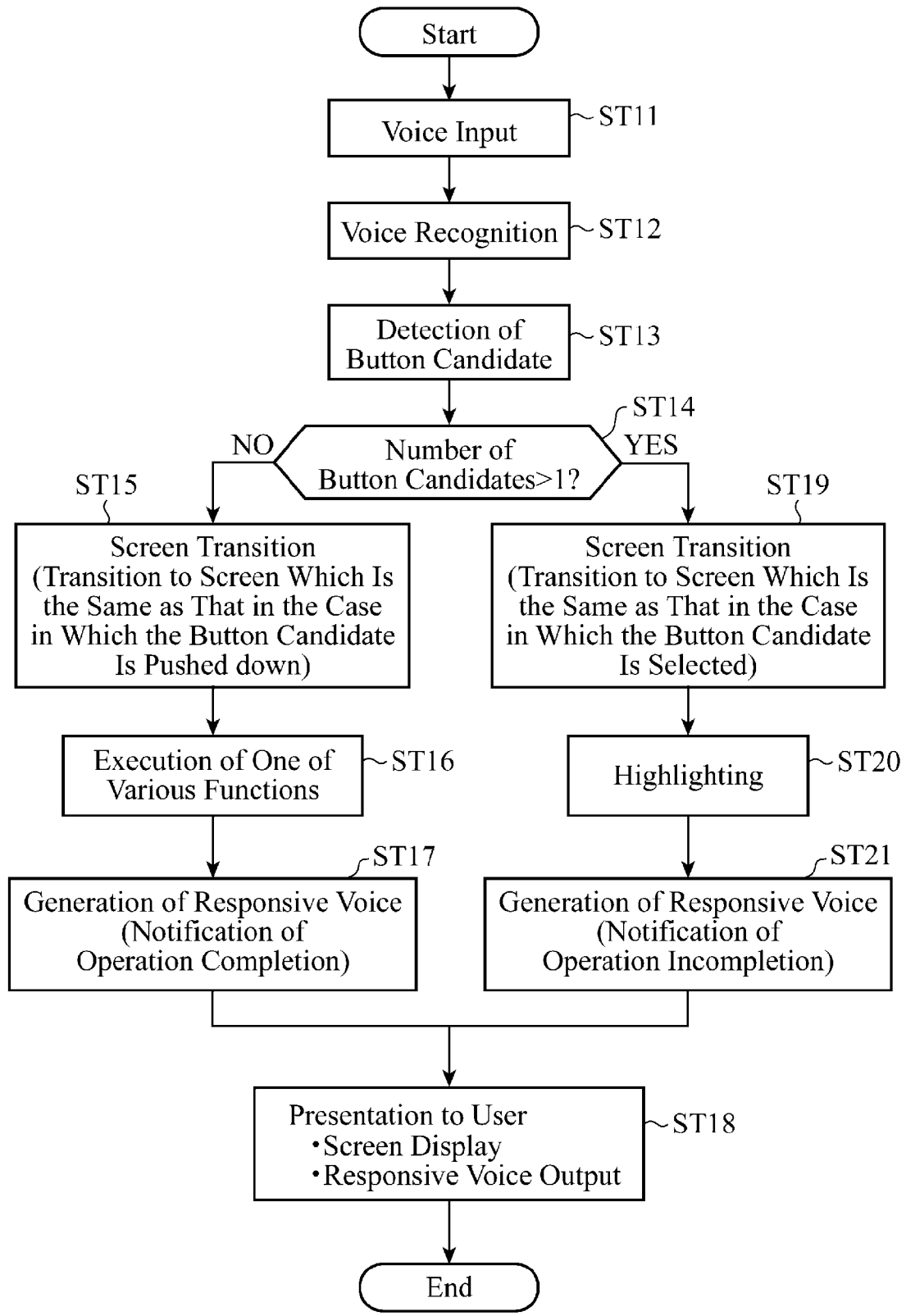
FIG. 2 is a flow chart showing the operation of the voice recognition device in accordance with Embodiment 1 of the present invention, focusing on a voice operation process including up to a presentation of a recognition result to a user after recognizing the user's voice.

In the above-mentioned flow chart shown in FIG. 8, the case in which the narrowing down of button candidates is applied to the voice operation process carried out by the voice recognition device in accordance with Embodiment 1 shown in the flowchart of FIG. 2 is explained. The narrowing down of button candidates can also be applied to the voice operation process carried out by the voice recognition device in accordance with Embodiment 1 shown in the flow chart of FIG. 5. In this case, the process of storing the operation history of the button candidate shown in step ST61 is carried out immediately before step ST32 of the flow chart shown in FIG. 5, and the button candidate narrowing down process shown in step ST62 is carried out immediately before step ST44. Similarly, the narrowing down of button candidates can also be applied to the voice operation process carried out by the voice recognition device in accordance with Embodiment 1 shown in the flow chart of FIG. 6. In this case, the process of storing the operation history of the button candidate shown in step ST61 is carried out immediately before step ST55 of the flow chart shown in FIG. 6.

As explained above, because the voice recognition device in accordance with Embodiment 2 of the present invention selects, as a button candidate, a button having a high probability of being operated by the user to highlight the button, the number of operations that the user will do until he or she carries out an intended operation can be reduced.

The voice recognition device in accordance with above-mentioned Embodiment 2 can be modified as follows. More specifically, the display control unit 15 sends button arrangement information showing button arrangement (how buttons are arranged on the screen) pre-stored therein to the button candidate narrowing unit 21.

The button candidate narrowing unit 21 refers to the button arrangement information sent thereto from the display control unit 15, and, when determining that the button candidates informed thereto from the button candidate detecting unit 13 are arranged continuously, selects the top one of the button candidates. The button candidate selected by this button candidate narrowing unit 21 is informed to the display control unit 15, the various function execution unit 17, and the responsive voice generating unit 18 as button candidate data.

Because according to this structure the top button candidate is selected and highlighted when the button candidates are arranged continuously, the user can easily understand the next operation which he or she should perform.

Industrial Applicability

As mentioned above, because in order to be able to carry out both a manual operation and a voice operation according to the same procedure, the voice recognition device in accordance with the present invention is constructed in such a way as to include: a voice input unit for inputting a voice of an uttered button name to convert the voice into an electric signal; a voice recognition processing unit for performing a voice recognition process according to a sound signal sent thereto, as the electric signal, from the voice input unit; a button candidate detecting unit for detecting, as a button candidate, a button having a button name which partially matches a voice recognition result acquired by the voice recognition processing unit; a display control unit for, when a plurality of candidate buttons are detected by the button candidate detecting unit, producing a screen showing a state in which at least one of the plurality of button candidates is selected; and a display unit for displaying the screen produced by the display control unit, the voice recognition device in accordance with the present invention is suitable for use as a voice recognition device that operates equipment, such as a navigation device, by voice, and so on.

The invention claimed is:
1. A voice recognition device comprising:
   a voice input unit that inputs a voice of an uttered button name to convert the voice into an electric signal;
   a voice recognition processing unit that performs a voice recognition process according to a sound signal sent thereto, as the electric signal, from said voice input unit;
   a button candidate detecting unit that compares a voice recognition result acquired by said voice recognition processing unit with button names prepared in advance of all buttons existing on all display screens so as to detect, as a button candidate, a button having a button name which partially matches the voice recognition result;
   a display control unit that, when a plurality of candidate buttons partially matching the voice recognition result are detected by said button candidate detecting unit, produces a screen showing a state in which at least one of said plurality of button candidates is selected; and a display unit that displays the screen produced by said display control unit.

2. The voice recognition device according to claim 1, wherein said voice recognition device includes a screen transition unit that, when the button candidate detected by the button candidate detecting unit does not exist on the screen being displayed, makes a transition to a screen on which said button candidate exists, and the display control unit produces the screen, to which a previous screen is being transited by said screen transition unit, showing a state in which the button candidate on the screen is selected.

3. The voice recognition device according to claim 2, wherein the display control unit includes a button control unit that changes a color or brightness of the button candidate selected on the screen or blinking said selected button candidate so as to highlight said selected button candidate.

4. The voice recognition device according to claim 2, wherein the display control unit includes a button control unit that changes a size or shape of the button candidate selected on the screen so as to highlight said selected button candidate.

5. The voice recognition device according to claim 1, wherein said voice recognition device includes a responsive voice generating unit that generates a sound signal showing a reading of the button name of the button candidate detected by the button candidate detecting unit, and a voice output unit that outputs the button name of the button candidate by voice according to the sound signal generated by said responsive voice generating unit.

6. The voice recognition device according to claim 1, wherein said voice recognition device includes a button candidate narrowing unit that refers to button arrangement information showing arrangement of buttons which is pre-stored in the display control unit, and, that, when determining that a plurality of button candidates detected by the button candidate detecting unit are arranged continuously, narrows down the plurality of button candidates to a top button candidate, and said display control unit generates a screen showing a state in which the button candidate narrowed down by said button candidate narrowing unit is selected.

7. The voice recognition device according to claim 1, wherein said voice recognition device includes an operation history collecting unit that collects operation histories, and a button candidate narrowing unit that narrows down a plurality of button candidates detected by the button candidate detecting unit to a button candidate according to the operation histories collected by said operation history collecting unit, and the display control unit generates a screen showing a state in which the button candidate narrowed down by said button candidate narrowing unit is selected.

* * * * *